SCANNING CIRCUIT USING CONTROLLED RECTIFIERS

Filed Dec. 3, 1962 2 Sheets-Sheet 1

WITNESSES:
Bernard R. Gieguey
James F. Young

INVENTOR
Alec H. B. Walker
BY Francis E. Blake
ATTORNEY

Oct. 5, 1965 A. H. B. WALKER 3,210,601

SCANNING CIRCUIT USING CONTROLLED RECTIFIERS

Filed Dec. 3, 1962 2 Sheets-Sheet 2

United States Patent Office 3,210,601
Patented Oct. 5, 1965

3,210,601
SCANNING CIRCUIT USING CONTROLLED RECTIFIERS

Alec H. B. Walker, Trafford, Pa., assignor to Westinghouse Electric Corporation, Pittsburgh, Pa., a corporation of Pennsylvania Filed Dec. 3, 1962, Ser. No. 241,640
13 Claims. (Cl. 315—27)

Figure 3:
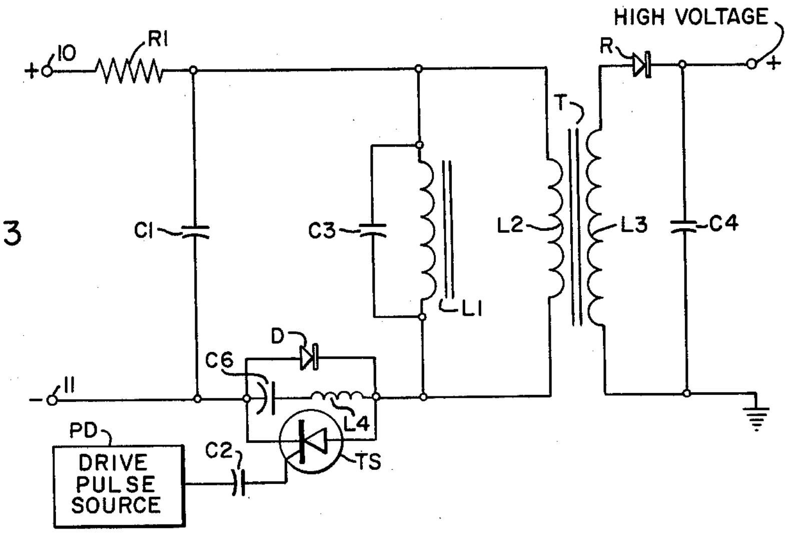

The present invention relates to circuits for developing in a coil an alternating current having at least one waveform period of saw-tooth waveform configuration, and more particularly to scanning circuits for producing saw-tooth deflection currents in a magnetic deflection coil or the like.

Circuits for producing deflection currents of substantially linear saw-tooth waveform in cathode ray tube deflection coils or the like are well known. The recent availability of solid state controllable rectifier devices such as silicon controlled rectifiers, has aroused interest in adapting such devices for use in deflection current circuits. Many advantages can be realized when such devices are incorporated in deflection circuits in view of their very low impedances when conducting and their relatively long life and dependability in comparison to the thermionic devices previously used with such circuits.

Problems are encountered when devising scanning circuits for using the solid state controllable rectifiers since it is desirable, if not necessary, to control the currents and voltages affecting the rectifiers when they are changing from conducting to non-conducting states. It is believed that all solid state controllable rectifiers of the silicon type have some so-called turn-off ability to varying degrees. In other words, the application of turn-off pulses to the gate or control electrode of the controllable rectifier may be used under favorable circumstances to turn-off the rectifier in the presence of other suitable circuit conditions of applied voltage and current. However, some silicon controlled rectifiers are specifically designed and manufactured to have the so-called turn-off properties and reference may be made to the copending patent application Serial No. 143,354, filed October 6, 1961, in the name of Thorndike, C. T. New and assigned to the same assignee as the subject patent application for a description of such a silicon controlled rectifier having desirable turn-off properties.

In copending application Serial No. 394,111, filed September 3, 1964, assigned to the same assignee as the present application, a solid state controlled rectifier, having a turn-off characteristic, and a deflection coil are connected in series with a source of direct current. A fly-back or resonating capacitor is connected in parallel with the coil and a diode is connected with reverse polarity to that of the controlled rectifier in parallel with the controlled rectifier. Means are provided to permit conduction of the controlled rectifier during generation of the current of saw-tooth waveform and to enable a change from conduction to non-conduction by the rectifier at the middle or intermediate point in each period of generation of saw-tooth waveform current in the coil. Assuming the solid state controllable rectifier is a device having good turn-off characteristics as described in the aforementioned copending patent application S.N. 143,354, then, a source of turn-off drive pulses which may be of negative polarity is connected in series with a suitable differentiating capacitor to the gate electrode of the rectifier and timed, for example, to turn-off the rectifier at the end of the period of generation of the saw-tooth trace current. The value of the differentiating capacitor is chosen to maintain the application of the turn-off pulse to the gate electrode of the controllable rectifier during the entire duration of the fly-back or retrace current period to thereby prevent the controlled rectifier from again becoming conductive during such time. The differentiating action of the capacitor also may function to subsequently establish turn-on conditions for the gate electrode of the controllable rectifier during the trace period when saw-tooth current is at first flowing through the diode so that the controlled rectifier may again become conductive as the diode ceases to conduct. Because of the relative difficulty of turning off a controlled rectifier under the most adverse of operating conditions, it would be advantageous to provide additional circuitry to ensure turn-off, to permit the use of a poorer quality device, and perhaps to eliminate the need for a device having the turn-off characteristic.

It is a principal object of the present invention to provide an improved scanning circuit for producing alternating currents having at least one waveform period of saw-tooth waveform characteristic and using solid state controlled rectifiers in place of thermionic devices with the scanning circuit including circuitry to aid in rendering the controlled rectifiers nonconductive.

Yet another object of the present invention is to provide an improved scanning circuit which may be used as the horizontal deflection circuit of a television receiver and which employs solid state controlled rectifiers of either the turn-off or conventional types and in which circuitry is included to aid in turning off the rectifiers.

Therefore, in accordance with the present invention a scanning circuit is provided in which the turning off of the controlled rectifier is facilitated by the addition of resonating circuitry. A series resonant circuit may be connected in parallel with either the series connected rectifier or the coil and is phased and tuned to a frequency related to the frequency of the scanning current such as to apply a secondary oscillating current to the rectifier so as to reduce the current through the controlled rectifier at the moment of turn-off and to delay the build-up of voltage across the controlled rectifier as it is turned off. If the Q of the series resonant circuit and other related parameters are such as to cause a high amplitude of so-called secondary oscillating current to be generated by the series resonant circuit, solid state controllable rectifiers of either limited or substantially no turn-off ability may be used since the resultant current through the rectifier may thereby be reduced to a value below its holding current value at the moment that the rectifier is to turn-off thus accomplishing the turn-off of the rectifier. It should be noted that one important discovery of the present invention is that the very low impedance of the solid state controlled rectifier when conducting, enables the superimposition of the secondary oscillating current of the series resonant circuit on the scanning current passing through the rectifier to obtain the desired turn-off current conditions without undesirable intermodulation of the scanning current in the deflection coil. When a high amplitude of oscillating current is provided by the series resonant circuit as just mentioned, it is possible to entirely obviate the use of turn-off pulses, if desired.

Figure 1:
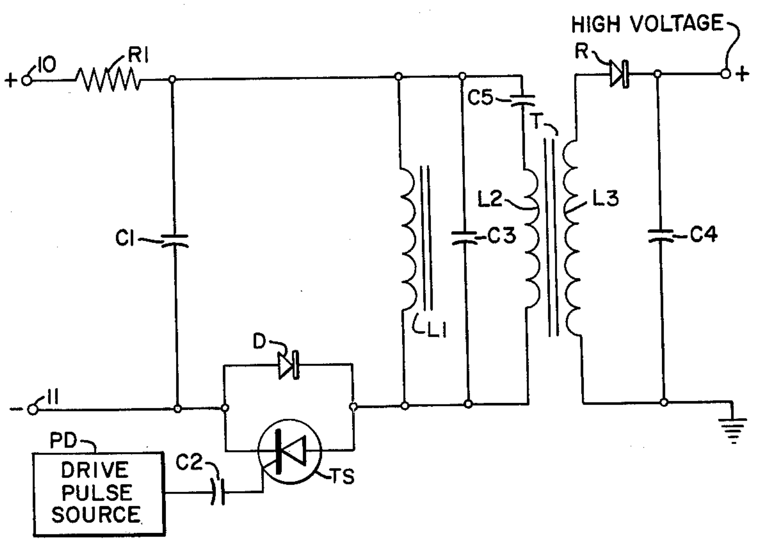
Figure 2:
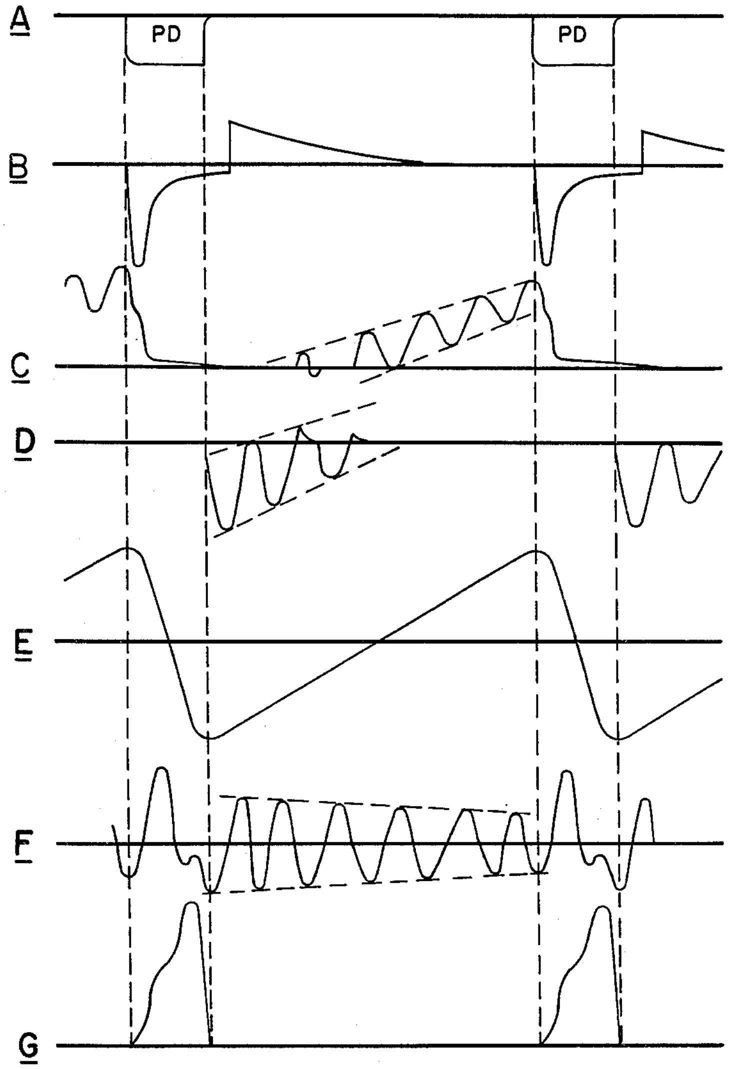

Further objects, features and the attending advantages of the invention will be apparent with reference to the following specification and drawings in which:

FIG. 1 is a circuit diagram of the present invention which may use a controllable rectifier having little or substantially no response to turn-off drive pulses;

FIG. 2 includes curves A–G which are waveforms used in the explanation of the operation of FIG. 1;

Curve A is waveform of the drive pulse voltage as may be employed with the circuit of FIG. 1;

Curve B is a waveform of the gate current for the controllable rectifier of FIG. 1;

Curve C is a waveform of the anode current through the controllable rectifier of FIG. 1;

Curve D is a waveform of the current through the diode of FIG. 1;

Curve E is a waveform of the current through the deflection coil of FIG. 1;

Curve F is a waveform of the current in the series resonant circuit of FIG. 1; and Curve G is a waveform of the anode-cathode voltage across the controlled rectifier; and FIG. 3 is a schematic diagram of an alternate arrangement for the resonant circuit as utilized herein.

The deflection coil is shown at L1 and a fly-back or resonating capacitor C3 is connected in parallel therewith. A source of direct current is indicated by the storage capacitor C1 connected to the current limiting resistor R1. The other end of the resistor R1 and the capacitor C1 are connected to the positive and negative terminals 10 and 11 respectively. From the following, it will be seen that the capacitor C1 is effectively the source of direct current for the deflection circuit to be described. A controllable rectifier of the silicon controlled type is shown as TS connected with its anode electrode to the coil L1 and its cathode electrode connected to the terminal 11. A diode D is connected with reverse polarity to the rectifier in parallel with the controllable rectifier TS. A source of drive pulses PD is connected in series with a differentiating capacitor C2 to the gate electrode of the controllable rectifier TS. It should be understood that the source of drive pulses PD is not shown in detail since it may use any of the well known forms of square wave pulse generator circuits to generate the square wave drive pulses as required.

The capacitor C3 is chosen to have a value such as to determine the retrace resonant frequency of the scanning current generated in the deflection coil L1. The turn-off drive pulses provided by the source PD in series with the differentiating capacitor C2 to the gate of the controllable rectifier TS are likewise chosen to have a repetition frequency substantially the same as the frequency of the scanning current in the deflection coil L1. The turn-off drive pulses from the source PD may be square wave negative pulses timed to occur at the beginning of each retrace current period at the end of the generation of the saw-tooth trace current in each cycle of scanning current to be produced in the coil L1. If the deflection circuit of FIG. 1 is to be used as a horizontal oscillator circuit for a television receiver or the like, a high voltage transformer T is connected across the yoke coil L1.

Referring now to FIG. 1 of the drawings which comprises the teachings of the present invention, a scanning circuit is shown capable of using silicon controlled rectifiers having limited or substantially no turn-off ability. The transformer T includes a primary winding L2 and a secondary winding L3. A capacitor C5 is connected to the winding L2, with the L2–C5 combination being connected across the coil L1. A diode R is connected in series with the winding L3 to produce a high voltage across a storage capacitor C4 for use as the anode voltage of a cathode ray tube.

It will be seen upon study of the circuit of FIG. 1 that a series resonant circuit comprising the capacitor C5 and primary winding L2 of transformer T is additionally connected in parallel with the deflection coil L1. Thus, in the present invention, the series resonant circuit comprising the coil L2 and capacitor C5 are tuned and phased to absorb energy from the deflection coil during and immediately after turn-off of the device TS, thus delaying and slowing the rate of rise of voltage on the anode of the controllable rectifier TS and also returning part of the energy to the coil L1 during the latter part of the retrace half cycle of oscillation of scanning current in the coil L1 and capacitor C3 thereby speeding up the reversal of the current in the coil L1 in order that the total retrace time may be completed within the time allowed for conventional television horizontal oscillator circuits. Additionally, the phase and frequency of the oscillating current in the series resonant circuit comprised of the capacitor C5 and inductor L2 is such as to substantially reduce the effective current through the controllable rectifier device TS at the time it is to be turned off by the drive current pulse applied to the series differentiating capacitor C2. As previously mentioned the very low impedance through the device TS while it is conducting enables the super-imposition of a secondary current such as the oscillating current of the resonant circuit including capacitor C5 and coil L2 to effectively reduce the current through the controllable rectifier TS at the time it is to be turned off and thus facilitate its turn-off action.

If the Q of the coil L2 is sufficiently high and its inductance is low accompanied by an increase in capacitance for the capacitor C5 while maintaining the desired LC ratio to obtain the desired frequency of oscillating current through the series resonant circuit, then the amplitude of the so-called secondary oscillating current may be made sufficiently great as to effectively reduce the current through the controllable rectifier device TS at the time it is to be turned off, to a value lower than its holding current value, thus turning off the controllable rectifier TS at the correct time. With the very high amplitude of oscillating current generated by the series resonant circuits C5, L2 and superimposed on the scanning current through the controllable rectifier TS as just described, it is possible to obviate the use of any negative turn-off drive pulse supplied by the source PD through the series differentiating capacitor C2. However, it may be preferable to use the negative turn-off drive pulse from the source PD at all times in order to assure that the controllable rectifying device TS will not again become conductive during the retrace current period when capacitor C3 is recharging and to ensure that after any temporary fault or surge condition the circuit will restart satisfactorily.

It is believed that the waveforms of FIG. 2 of the drawings are self-explanatory, but it is desired to point out that the waveforms C, D and F are of particular interest to show the phase and frequency of the superimposed oscillating currents provided by the additional series resonant circuit having capacitor C5 and coil L2 as described.

Referring again to FIG. 1 of the drawings, it will be seen that the coil L2 of the series resonant circuit may suitably be comprised of the primary winding of a high voltage transformer T whose secondary winding is connected to the high voltage rectifier R and high voltage storage capacitor C4. Of course the invention is not to be limited to the use of the high voltage transformer T as the inductor of the series resonant circuit since it may be eliminated without effecting the operation of the deflection circuit of the invention in which case a suitable series resonant inductor would be substituted therefor.

It should be noted that the current limiting resistor R1 connected to charge the D.C. source capacitor C1 will be effective to limit any current through the controllable rectifier device TS should it remain conducting at a time when it should be non-conductive. The current can thereby be limited to a value which can be turned off on the resumption of negative gate drive pulses, for example.

Curve A of FIG. 2 shows the waveform of the input turn-off drive voltage PD supplied to the controllable rectifier TS through the series capacitor C2. This consists of a steep front negative pulse of short rise time (not necessarily flat-topped) having a duration exceeding the entire retrace current period, so that after differentiation by the capacitor C2 the desired gate current is achieved.

Curve B shows the desired gate current produced by differentiation of the input drive voltage by the capacitor C2 and the gate input resistance providing a negative current pulse of short rise time which decays away but remains negative during the whole of the retrace current. The tail-end of the input drive voltage produces a positive gate current which persists long enough for the controllable rectifier TS to conduct forward current whenever necessary during the trace current portion of the cycle, as will be seen from curve C.

The sinusoidal current in the series resonant circuit L2, C5 substracts from the linear scan current at the instant of turn-off of the rectifier TS resulting in a rapid fall in its anode current (in a typical case, in less than one microsecond) so that the anode current falls to a low value, substantially zero during the delay portion of the rise of anode voltage as shown by curve G.

The current carried by the diode D during the first part of the generation of the linear saw-tooth scanning current is a combination of the saw-tooth and sinusoidal current and, as will be noted from curve O, at the middle of the generation of trace current, the current may commutate back and forth several times from the diode D to the controllable rectifier TS as it reverses, due to the large sinusoidal component. For this reason the gate electrode of the controllable rectifier TS should be held positive during this time period, as illustrated by the gate current waveform in curve B.

The current through the deflection coil L1 during the trace current period is almost perfectly linear, as shown by curve E, and has a rapid fly-back time in typical circumstances of under 10 microseconds.

The series resonant circuit L2, C5 must be correctly designed for its proper operation at the vital point in the trace current period and it is so tuned that after being shock excited by energy transfer at the start of the fly-back or retrace current, it continues to oscillate during the remainder of the trace current period. It is, however, tuned to such a frequency and phase that at the moment of turn-off of the controllable rectifier TS, it is correctively phased: (a) to absorb the energy from the coil L1 and produce a delay in the rise of anode voltage on the device TS; (b) to produce a slower rate of rise in the said anode voltage; and (c) to return some energy to the coil L1 at the end of the retrace period to produce a fast fall in the anode voltage of the controllable rectifier TS and a rapid reversal of current in the coil L1.

These points will be noted from curves F and G. In particular from curve F, it can be seen the phase of current in the series resonant circuit L2, C5 at the instant of turn-off; the amplitude increase in the current of the said circuit at the start of the retrace period; and the amplitude fall in the said current as a bite into the next negative half cycle, which would otherwise have been large—this being when energy is returned to the coil L1.

As will be seen from curve G, illustrating the anode-cathode voltage of the controllable rectifier TS, there is a delay in the start of the anode voltage rise, and a relatively slow rate of rise thereafter. In typical circumstances out of a total of 10 microseconds available for retrace time, the total rise time might be 7 microseconds (including a delay of one and one-half microseconds), while the total fall might be only 3 microseconds.

The frequency to which the circuit L2, C5 may be tuned to achieve a satisfactory result is rather critical and of limited range since it must be close to a second harmonic of the scanning current frequency and must also be chosen to produce the desired phase of current in the inductance L2 at the next turn-off instant for the controllable rectifier TS. In other words, the number of cycles of oscillations of current for the series resonant circuit which may be fitted in between retrace current operations of the scanning current is capable of only a little variation.

In a specific example, at a television horizontal scanning frequency of 15,750 cycles per second, the circuit L2, C5 is tuned to a frequency of 115 kilocycles per second, providing approximately 6¼ cycles of free oscillation during the horizontal scan period of 53.5 microseconds. Alternatively, a frequency of approximately 135 kilocycles per second may be chosen for the tuned circuit L2, C5, giving approximately 7¼ cycles of free oscillation during the horizontal trace current period, the exact frequency varying with the losses of the circuit and being selected to provide an optimum value for any particular circuit design.

In the foregoing, there has been described a novel form of solid state scanning circuit employing solid state controllable rectifier devices of the silicon controlled rectifier type. It should be noted that the invention is directed to the embodiment of FIG. 1 wherein a resonating circuit is utilized to aid in turning off the controlled rectifier. It will be apparent to those skilled in the art, that various modifications may be made within the scope of the invention.

For example, although the series resonant circuit embodying the capacitor C5 and coil L2 has shown to be connected in parallel with the yoke coil L1, it should be obvious that such series resonant circuit may be placed at other points in the deflection current circuit such as in parallel with the controllable rectifier device TS. This modification is shown in FIG. 3 of the drawing with a series combination of an inductor L4 and a capacitor C6 connected across the controlled rectifier TS.

I claim as my invention:

1. A circuit for generating an alternating current having at least one wave-form period of saw-tooth waveform comprising, a source of direct current, a coil, a resonating capacitor operatively connected to said coil, a solid state controlled rectifier having anode, cathode and gate electrodes with its anode and cathode electrodes connected between said coil and said source, a diode connected in reverse polarity to said rectifier to pass current to said coil in an opposite direction to that passed by said rectifier, and series resonant means operatively connected to said rectifier to enable said rectifier to cease conducting at least once during generation of each cycle of alternating current in said coil.

2. The invention of claim 1 in which said source of direct current is comprised of a storage capacitor and a current limiting charging resistance connected together, said resistance being connected in series with said coil and said controllable rectifier.

3. A circuit for generating an alternating current having at least one wave-form period of saw-tooth waveform in each cycle comprising, a source of direct current, a coil, a resonating capacitor operatively connected to said coil, a solid state controlled rectifier having anode, cathode and gate electrodes with its anode and cathode electrodes connected between said coil and said source, a diode connected in reverse polarity to said rectifier to pass current to said coil in an opposite direction to that passed by said rectifier, drive pulse means connected to said rectifier to cause said rectifier to cease conducting at least once during generation of each cycle of alternating current in said coil, and series resonant means operatively connected to said rectifier to reduce the current flow through said rectifier to enable said rectifier to cease conduction in response to said drive pulse means.

4. A circuit for generating an alternating current having at least one waveform period of saw-tooth waveform in each cycle comprising, a source of direct current, a coil and associated parallel connected resonating capacitor, a solid state controlled rectifier having anode, cathode and gate electrodes with its anode and cathode electrodes connected between said coil and said source, a resonant circuit comprising an inductor and a capacitor connected in series with each other and being operatively connected to said rectifier, and a diode connected in reverse polarity to said rectifier to pass current to said coil in an opposite direction to that passed by said rectifier, the amplitude, phase and frequency of the current of said resonant circuit being related to the phase and frequency of the saw-tooth waveform current in said coil such as to effectively lower the current through said rectifier below its holding current value to turn off said rectifier and to delay the rise in voltage across said rectifier when said rectifier starts to turn off at the end of the period of generation of the current of saw-tooth waveform.

5. A circuit for generating an alternating current having at least one waveform period of saw-tooth waveform in each cycle comprising, a source of direct current, a coil and associated parallel connected resonating capacitor, a solid state controlled rectifier having anode, cathode and gate electrodes with its anode and cathode electrodes connected respectively to said coil and said source, a resonant circuit connected across said coil and comprising an inductor and a capacitor connected in series with each other, and a diode connected in reverse polarity to said rectifier to pass current to said coil in an opposite direction to that passed by said rectifier, the amplitude, phase and frequency of the current of said resonant circuit being related to the phase and frequency of the saw-tooth waveform current in said coil such as to effectively lower the current through said rectifier below its holding current value to thereby turn-off said rectifier and to delay the rise in voltage across said rectifier when said rectifier starts to turn off at the end of the period of generation of the current of saw-tooth waveform.

6. A circuit for generating an alternating current having at least one waveform period of saw-tooth waveform in each cycle comprising, a source of direct current, a coil and associated parallel connected resonating capacitor, a solid state controlled rectifier having anode, cathode and gate electrodes with its anode and cathode electrodes connected respectively to said coil and said source, a resonant circuit connnected across said rectifier and comprising an inductor and a capacitor connected in series with each other, a diode connected in reverse polarity to said rectifier to pass current to said coil in an opposite direction to that passed by said rectifier, a source of turn-off drive pulses, and a differentiating capacitor connected in series with said source of drive pulses and the gate electrode of said rectifier in a manner to permit turn-off of said rectifier at the end of each period of generation of current of saw-tooth waveform in said coil, the duration of said turn-off pulse being at least greater than the duration of the fly-back current before the start of each period of generation of current with saw-tooth waveform in said coil, the phase and frequency of the current of said resonant circuit being related to the phase and frequency of the saw-tooth waveform current in said coil such as to effectively lower the current through said rectifier at the moment said rectifier is to turn-off and to delay the rise in voltage across said rectifier when said rectifier starts to turn-off at the end of the period of generation of the current of saw-tooth waveform.

7. A circuit for generating an alternating current having at least one waveform period of saw-tooth waveform in each cycle comprising, a source of direct current, a coil and associated parallel connected resonating capacitor, a solid state controlled rectifier having anode, cathode and gate electrodes with its anode and cathode electrodes connected respectively to said coil and said source, a resonant circuit connected across said coil and comprising an inductor and a capacitor connected in series with each other, a diode connected in reverse polarity to said rectifier to pass current to said coil in an opposite direction to that passed by said rectifier, a source of turn-off drive pulses, and a differentiating capacitor connected in series with said source of drive pulses and the gate electrode of said rectifier in a manner to permit turn-off of said rectifier at the end of each period of generation of current of saw-tooth waveform in said coil, the duration of said turn-off pulse being at least greater than the duration of the fly-back current before the start of each period of generation of current with saw-tooth waveform in said coil, the phase and frequency of the current of said resonant circuit being related to the phase and frequency of the saw-tooth waveform current in said coil such as to effectively lower the current through said rectifier at the moment said rectifier is to turn-off and to delay the rise in voltage across said rectifier when said rectifier starts to turn-off at the end of the period of generation of the current of saw-tooth waveform.

8. A television scanning circuit for generating an alternating current of horizontal frequency having at least one waveform period of saw-tooth waveform in each cycle comprising, a source of direct current, a coil and associated parallel connected resonating capacitor, a solid state controlled rectifier having anode, cathode and gate electrodes with its anode and cathode electrodes connected between said coil and said source, a resonant circuit operatively connected to the anode electrode of said rectifier and comprising an inductor and a capacitor connected in series with each other, a diode connected in reverse polarity to said rectifier to pass current to said coil in an opposite direction to that passed by said rectifier, a source of turn-off drive pulses having a frequency equal to the horizontal frequency of the alternating current to be generated in said coil, and a differentiating capacitor connected in series with said source of drive pulses and the gate electrode of said rectifier in a manner to permit turn-off of said rectifier at the end of said period of generation of current of saw-tooth waveform in said coil, the duration of said turn-off pulse being at least greater than the duration of the fly-back current before the start of each period of generation of current with saw-tooth waveform in said coil, the phase and frequency of the current of said resonant circuit being related to the phase and frequency of the current of said resonant circuit being related to the phase and frequency of the saw-tooth waveform current in said coil such as to effectively lower the current through said rectifier at the moment said rectifier is to turn-off and to delay the rise in voltage across said rectifier when said rectifier starts to turn-off at the end of the period of generation of the current of saw-tooth waveform.

9. The invention of claim 8 in which said inductor is provided with a high voltage secondary winding, and a high voltage rectifier is connected in series with said secondary winding to provide a source of high voltage for a cathode ray television picture tube.

10. In a scanning circuit operative with a source of direct current the combination of: a controlled rectifier, a coil connecting said controlled rectifier to said source, a resonating capacitor operatively connected to said coil, a diode operatively connected to said controlled rectifier in reverse polarity thereto to pass current to said coil in an opposite direction to that passed by said rectifier, and resonant circuit means operatively connected to said controlled rectifier for turning off said controlled rectifier at predetermined times.

11. In a scanning circuit operative with a source of direct current the combination of: a controlled rectifier having a gate turn-off characteristic, a coil connecting said controlled rectifier to said source, a resonating capacitor operatively connected to said coil, a diode operatively connected to said controlled rectifier in reverse polartiy thereto to pass current to said coil in an opposite direction to that passed by said rectifier, gate pulse means operatively connected to said controlled rectifier to apply gating signals to said controlled rectifier to turn-off said rectifier at predetermined times and resonant circuit means operatively connected to said controlled rectifier to aid in turning off said rectifier at predetermined times.

12. In a scanning circuit operative with a source of direct current the combination of: a controlled rectifier including anode, cathode and gate electrodes and having a gate turn-off characteristic, a parallel circuit combination of a coil and a resonating capacitor connecting said controlled rectifier to said source, a diode connected between the anode and cathode electrodes across said controlled rectifier in reverse polarity thereto, gate pulse means operatively connected to the gate electrode of said controlled rectifier to apply gating signals to said controlled rectifier to turn-off said rectifier at predetermined times, and resonant circuit means connected between the anode and cathode electrodes of said controlled rectifier to aid in turning off said rectifier at predetermined times.

13. In a scanning circuit operative with a source of direct current the combination of: a controlled rectifier including anode, cathode and gate electrodes and having a gate turn-off characteristic, a parallel circuit combination of a coil and a resonating capacitor connecting said controlled rectifier to said source, a diode connected between the anode and cathode electrodes across said controlled rectifier in reverse polartiy thereto, gate pulse means operatively connected to the gate electrode of said controlled rectifier to apply gating signals to said controlled rectifier to turn-off said rectifier at predetermined times, and resonant circuit means connected across said coil to aid in turning off said controlled rectifier at predetermined times.

References Cited by the Examiner

IRE Dictionary of Electronics Terms and Symbols, Institute of Radio Engineers, New York, 1961, page 130.

DAVID G. REDINBAUGH, *Primary Examiner.*